United States Patent [19]

Hounsel

[11] Patent Number: 5,065,987
[45] Date of Patent: * Nov. 19, 1991

[54] REFRACTORY CERAMIC FIBER LADLE COVERS

[75] Inventor: Mack A. Hounsel, Houston, Tex.

[73] Assignee: J T Thorpe Company, Houston, Tex.

[*] Notice: The portion of the term of this patent subsequent to Jan. 8, 2002 has been disclaimed.

[21] Appl. No.: 265,239

[22] Filed: Oct. 31, 1988

Related U.S. Application Data

[63] Continuation of Ser. No. 665,927, Oct. 29, 1984, abandoned, and a continuation-in-part of Ser. No. 564,745, Dec. 21, 1983, Pat. No. 4,492,382.

[51] Int. Cl.5 .............................................. C21C 5/44
[52] U.S. Cl. .................................. 266/283; 266/286; 266/287
[58] Field of Search ............... 266/286, 287, 283, 280, 266/44, 901; 52/509, 506, 404; 432/250

[56] References Cited

U.S. PATENT DOCUMENTS

| | | | |
|---|---|---|---|
| 4,001,996 | 1/1977 | Byrd, Jr. ............................... | 52/509 |
| 4,229,211 | 10/1980 | Battles ................................. | 266/141 |
| 4,429,504 | 2/1984 | Hounsel et al. ...................... | 52/506 |
| 4,492,382 | 1/1985 | Hounsel .............................. | 266/286 |

Primary Examiner—S. Kastler
Attorney, Agent, or Firm—Pravel, Gambrell, Hewitt, Kimball & Krieger

[57] ABSTRACT

Ladle covers are insulated with refractory ceramic fiber modules. An outer portion of a lower part of the cover conforming to the shape of the ladle rim is insulated with trapezoidal modules. A central portion beneath the cover within the outer portion is insulated with rectangular modules, which may be of less thickness than the trapezoidal modules.

9 Claims, 3 Drawing Sheets

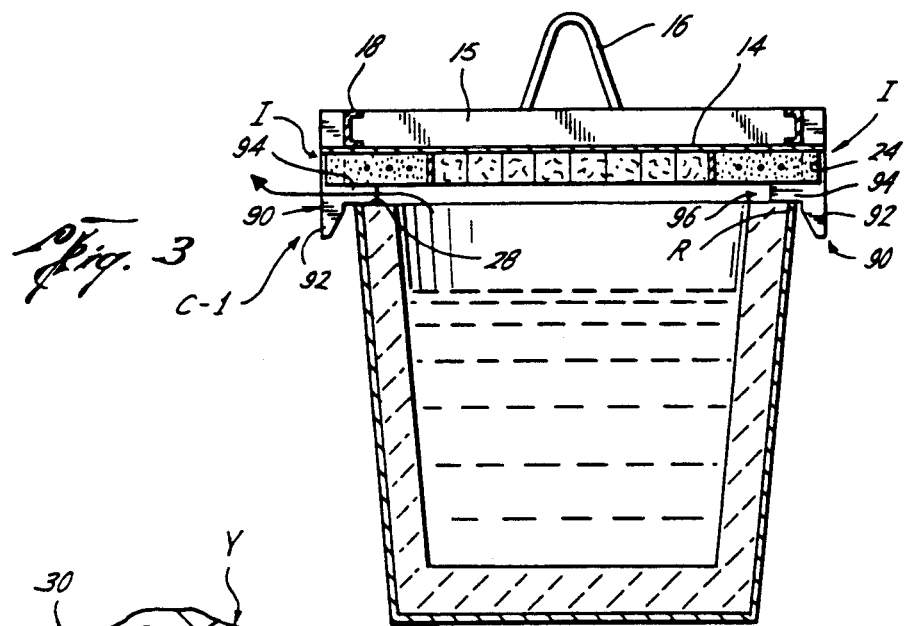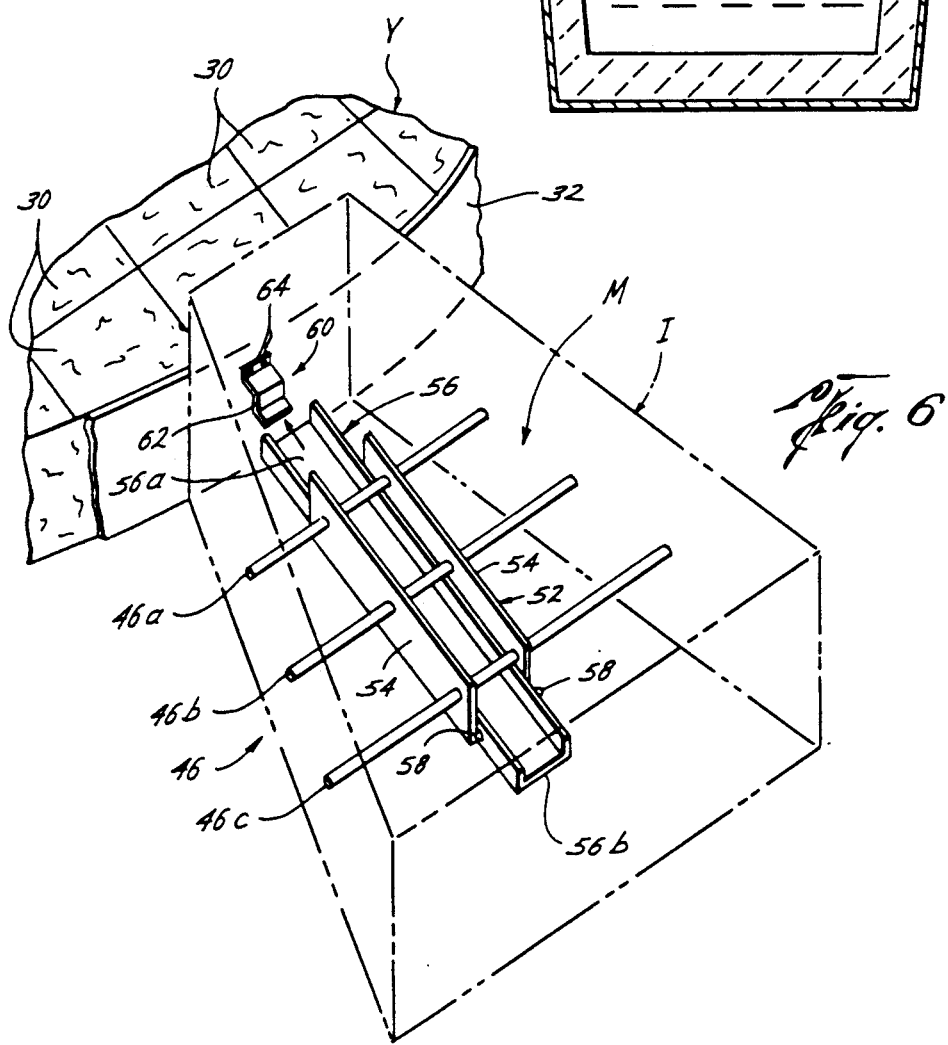

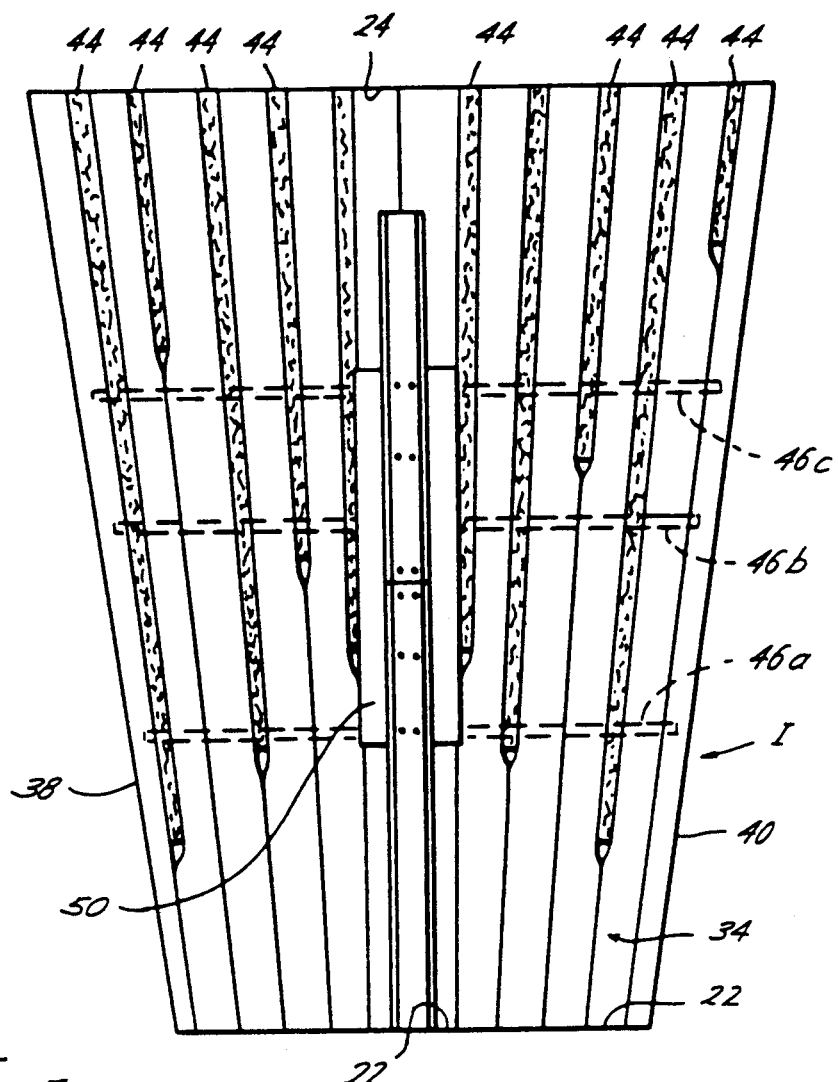
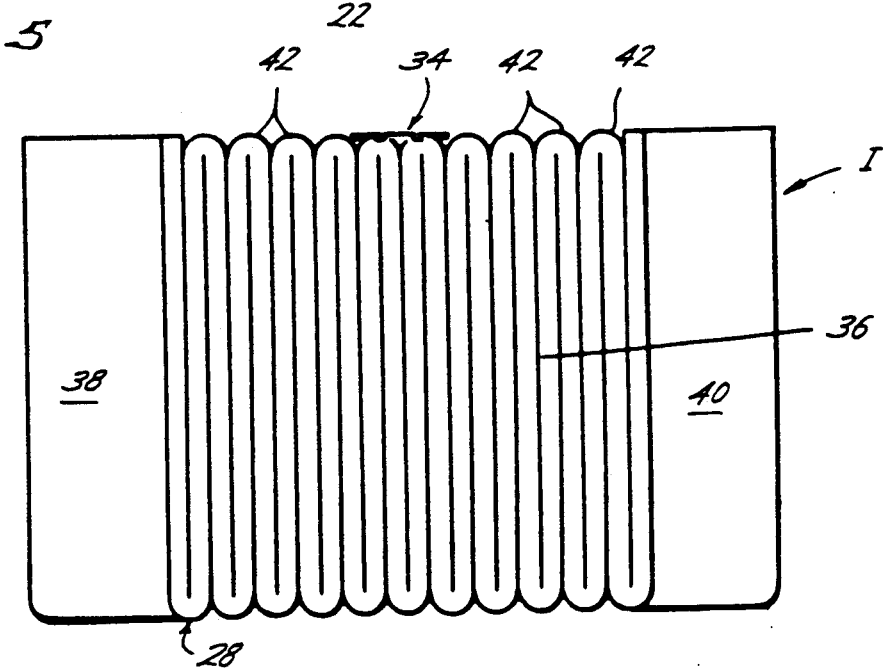

REFRACTORY CERAMIC FIBER LADLE COVERS

CROSS-REFERENCE TO RELATED APPLICATION

The present application is a continuation of co-pending application Ser. No. 665,927 filed on Oct. 29, 1984, now abandoned and a continuation-in-part of prior copending U.S. patent application Ser. No. 564,745 filed Dec. 21, 1983, now U.S. Pat. No. 4,492,382.

BACKGROUND OF INVENTION

1. Field of Invention

The present invention relates to insulating ladle covers with refractory ceramic fiber modules.

2. Description of the Prior Art

It is known to be desirable to install insulated covers over ladles used in steelmaking to prevent heat loss. When the ladle contained a bath of molten steel, an insulated ladle cover suppressed heat loss from the steel bath surface. Once the molten steel had been poured, the cover conserved heat in the lining of the ladle. Although vulnerable to slag or metal contact refractory ceramic fibers offered certain advantages in insulating ladle covers, namely light weight, resilience and insulating value.

So far as is known to applicant, ceramic fibers have been installed in ladle covers in several ways. One method involved laying a refractory ceramic fiber blanket strip on one side edge in a spiral fashion onto a lower surface of a round ladle lid and gluing the side edge to the lid. Metal anchors were placed at selected positions to facilitate the gluing and in an attempt to put the blanket strip in some degree of compression. Installation of the spiral wrapped blanket on the lid was time consuming and relatively difficult. Other lining methods included the use of standard refractory ceramic fiber modules of block form and various edge-stacked methods. In all of these methods, the ceramic fiber was by necessity of uniform thickness over the entire surface of the lid, placing excessive insulation at the center of the ladle lid which would have been better used in the high wear area of the ladle rim.

It was also difficult in these prior art ladle cover fiber linings to repair the insulation in the area of the rim seal independently of the center portion. Repair usually required a complete relining of the insulative cover. Another problem with prior art ladle cover seals was the requirement of an outside diameter retainer ring to support the fiber material. Located near the area of contact with the ladle rim during sealing, the retainer ring was susceptible to heat leaks, resulting in warping or oxidation of the steel.

SUMMARY OF INVENTION

Briefly, the present invention provides a new and improved seal and cover for the top of a ladle which is attached to support framework by means of which the cover may be moved, such as by a crane hook. A plurality of refractory ceramic fiber insulating units are provided, each formed of a plurality of adjacent layers of refractory ceramic fiber insulating material. The layers have an inner surface adjacent the support framework of the ladle cover and an outer surface adapted to be contacted by the rim of the ladle. The layers of refractory ceramic fiber are formed to lie, when mounted, in planes extending radially outwardly from a central portion of the ladle and are thus formed as trapezoidal units. The insulating units are preferably mounted in a ring pattern about a central portion of the cover beneath the support framework. The central portion beneath the framework is preferably lined with a plurality of refractory ceramic fiber insulating modules, which may be of a lesser thickness than the ring of insulating units. The insulating units may be mounted on the cover so that they are brought into contact with the ladle rim when the cover is placed over the ladle, forming a seal with the rim of the ladle. Alternatively, the insulating units may be mounted so that when the cover is placed atop or over the ladle, vent passages or flues are formed.

BRIEF DESCRIPTION OF THE DRAWINGS

FIG. 3 is an elevation view, taken partly in cross-section, of an alternative embodiment of the present invention;

FIG. 4 is a plan view of a refractory ceramic fiber insulation module used in the ladle cover of FIGS. 1, 2 and 3;

FIG. 5 is an elevation view of the refractory ceramic fiber insulation module of FIG. 4; and FIG. 6 is an isometric view, partially schematic, of an attachment mechanism of the present invention for modules in a ladle cover.

DESCRIPTION OF PREFERRED EMBODIMENT

Figure 1:
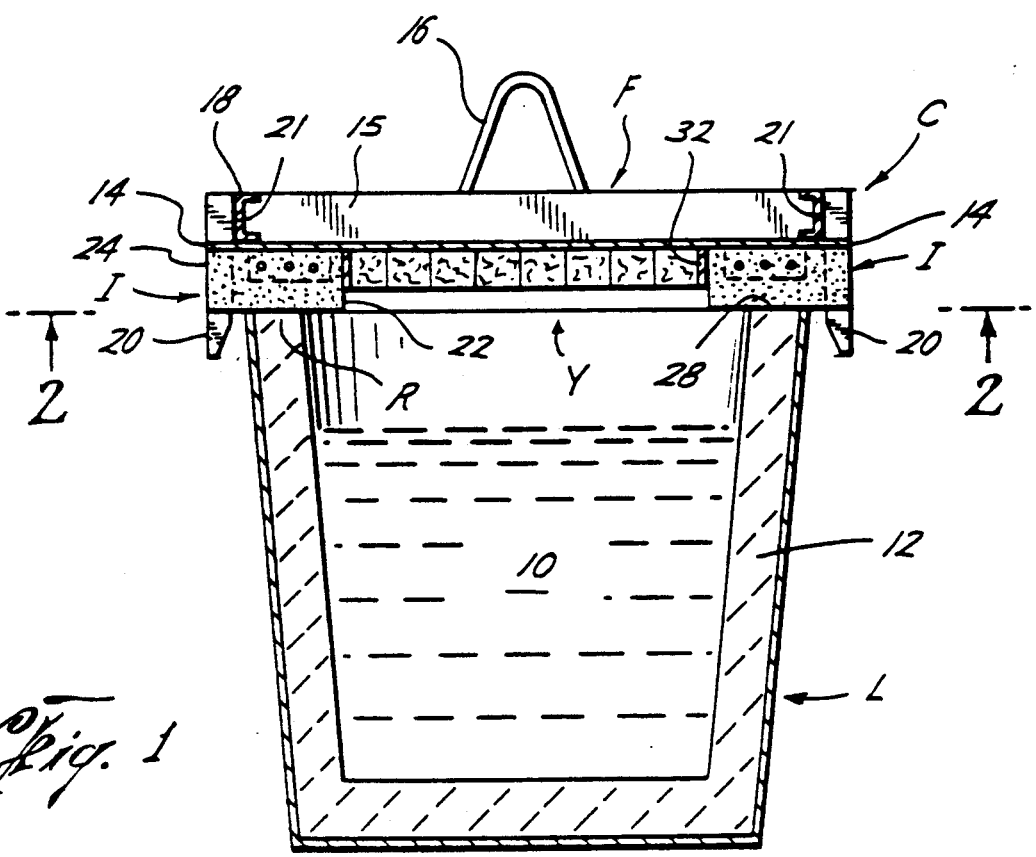
FIG. 1 is an elevation view, taken partly in cross-section, of a ladle sealed with a cover according to the present invention.

In the drawings, the letter C designates generally a cover for insulating a rim R of a ladle L in a steel plant or the like. The cover C is used to insulate the ladle L both when the ladle L contains a bath 10 of molten metal within a refractory lining 12, as well as when the ladle L is empty after the molten metal has been poured. The cover C includes a plurality of refractory ceramic fiber insulation units I mounted beneath support framework F by mounting means M.

The support framework F includes a top plate member 14 of a suitable thickness of steel or the like conforming generally to the shape of the rim R, which is typically round in configuration, generally being either circular or elliptical. A lifting bail or eyelet 16 is mounted above a transverse support beam 15 extending from one side to the other of the top plate 14 so that the cover C may be moved into position atop the ladle L and later removed. An outer support channel 18 is also mounted about the outer periphery above the top plate 14 for strengthening the cover C. Centering guides 20 are formed extending downwardly from an outer surface 21 of the support channel 18 at selected locations. The center guides 20 insure that the cover C is properly positioned on the ladle L when being mounted to insulate the ladle L.

The plurality of refractory ceramic fiber ring insulation units I of the ladle cover C are mounted about the periphery of the support framework F extending radially between an inner face 22 located beneath the top plate 14 and an outer face 24 which is located beyond the outer surface 21 of channel member 18. In the preferred embodiment, the insulation units I function to seal along an outer surface 28 against the rim R when contacted and to insulate the area of contact between rim R and the ladle cover C. The units I are mounted on the support framework F of the ladle L in a round pattern, typically circular or oval, conforming to the shape of rim R. In the preferred embodiment, a layer Y of refractory ceramic fiber insulation is mounted beneath the ladle cover C within the round pattern formed by the insulation unit I. The layer of refractory ceramic fiber Y may take the form of any one of numerous commercially available refractory ceramic fiber modules 30. Examples are the folded refractory ceramic fiber blanket modules of U.S. Pat. Nos. 3,952,470 and 4,001,996, which are incorporated herein by reference. It should be understood, however, that other configurations of refractory ceramic fiber modules, or even refractory brick, castables and the like, if desired, may equally as well be used. A packing or gasket 32 of refractory ceramic fiber is inserted between the insulating units I and layer Y to seal any gaps which are present after unit I and the layer Y have been installed.

Considering the insulation units I more in detail, each takes the form of a plurality of adjacent layers of a suitable, commercially available, refractory ceramic fiber insulating material, the particular fiber used being based upon the expected temperature and surface conditions. Each of the units I has an inner surface portion 34 adapted to be mounted to the plate member 14 and the outer surface portion 28 adapted to be contacted by the rim R of the ladle L. Intermediate portions 36 of the adjacent layers of refractory ceramic fiber insulating material extend between the inner surface portion 34 and the outer surface portion 28. The modules or units I also have radially extending side contact walls 38 and 40 which are brought into diametric compression with similar side contact walls of adjacent units I when installed.

Previously in ladle covers, all of the refractory ceramic fiber insulation material comprising the ladle cover lining were by necessity the same thickness. The high wear seal area adjacent the rim R demanded a thicker module than was needed to insulate the inner area above a center portion of the ladle L. The present invention provides independent optimization of module thickness in the seal area for resistance to mechanical abuse, as well as for cost effective insulation of the ladle cover C above the inner layer Y. Typically, the thickness of the unit I between inner surface portion 28 and outer surface portion 34 is greater than that of the modules 30, in some cases as much as seven inches. In this manner, the units I are first contacted and damaged by slag from the ladle L. The thickness of the ring units I can thus be selected to provide an extended service life. Since the modules 30 are spaced from contact with the rim R, the thickness of layer Y can be based on thermal and material cost considerations. For example, a higher temperature rating for insulation in layer Y may be selected due to shrinkage considerations. Also, a thinner layer Y may be not only adequate for insulation purposes, but also afford cost savings over thicker modules in ring units I. Since the units I are easier to replace, independent of the center section, an advantage is also provided by using different thicknesses of sealing units I and insulating modules 30.

Thus, the ladle cover C, with its trapezoidal modules I and the modules 30 of layer Y, forms a new and improved insulating and sealing cover for ladles with the advantages discussed above. In certain situations with the present invention, the trapezoidal modules need not have any radially oriented fiber layers. Rather, they may be trapezoidal with layers extending generally in diametrical planes with respect to the center of the ladle and extending between alternating folds formed adjacent side surfaces 38 and 40, although less diametrical compressive effect may be achieved. In such an embodiment, the inner surface portion 22 and the outer surface portion 24 would be formed of layers of the refractory ceramic fiber material. Also, the layers may in another embodiment extend diametrically from the center portion of the ladle L between folds against the plate member 14 and the folds adapted to be contacted by the rim R. In such an embodiment, the inner surface portion 28 and the outer surface portion 34 of the units I would be formed of diametrically arranged folds. Another alternative would be to form a composite monolithic, trapezoidal module from a number of layers of refractory material.

In the embodiment shown in the drawings, folds 42 are formed from adjacent ones of the plurality of adjacent layers 36 at each of the inner surface portions 28 and the outer surface portions 24, forming an accordion-style ceramic fiber blanket. It should be understood, however, that in insulating units I only the inner surface portions 28 or the outer surface portions 34 may have folds 42 formed, as in U.S. Pat. No. 3,952,470. Also, the insulating units I may have the refractory fiber in the form of edge-grain layers, with no folds formed at either the inner surface portions 28 or the outer surface portions 34.

In the insulating unit I, refractory ceramic stuffing strips 44 of varying lengths are mounted between selected ones of the plurality of adjacent layers, causing the insulating unit I to form a trapezoidal shape (FIG. 4). By varying the length and position of these stuffing strips, a uniform nominal compression is maintained from the inner face 22 to the outer face 24. With trapezoidal insulation units I of the present invention, several advantages are afforded. The layers of blanket in the units I are radially oriented in planes extending outwardly between inner faces 22 and outer faces 24 of the unit I, from a central portion of the ladle cover C. When the ladle rim R is circular, the center point of the ladle cover serves as the point of origin for the radial orientation of the layers of blanket. If the rim R is oval or elliptical, a point at or near the general center of each arcuate surface may serve as the point of origin. Where the rim is an elongate oval, rectangular modules such as according to U.S. Pat. No. 4,001,996 and other types on the market may be used along the straight portions of the oval. The radial orientation of the fiber layers in units I produces substantially uniform diametrical compression between adjacent units I about the ladle cover C without the presence of any connecting joints between them in the seal area. The radial orientation of the folds also provides stability in the seal formed against the rim R. Further, since there is no inherent radial compression no inner or outer retaining plate is required.

Due to the radial orientation of the joints between seal ring modules I, a seal is formed acting as a tightly compressed, monolithic mass of fiber. This is to be contrasted with seals formed from rectangular or prismic modules. When such modules were used in the seal area, joints between modules formed a crisscross pattern so that compression between modules was not unidirectional relative to the ladle rim. Only a portion of a module might be subjected to the sealing force, so that individual modules were displaced. This caused opening of gaps with attendant heat leaks. The trapezoidal shape of the units I also permits them to be individually installed and removed without obstruction by adjacent units and with little, if any, effect on adjacent units. Since the seal area is the one of highest wear, this is another advantage. Also, the seal ring of modules I could be replaced as a complete subassembly, if desired.

The insulating units I receive a plurality of mounting support rods 46 which extend transversely through the plurality of transverse layers of the unit I in the intermediate portions 36 at a suitable distance from the outer surface portion 34. The support rods 46 are of a length lightly less than the transverse dimension of the trapezoidal insulating unit 1 at the locations in which they are inserted. As can be seen in FIGS. 4 and 6, each of the rods 46a, 46b and 46c is of a different length.

The rods 46 are received in openings formed in a C-shaped support channel member 48, much in the manner, for example, of U.S. Pat. No. 4,381,634. The channel member 48 is mounted with an attachment member 50 (FIG. 4) which attaches the support channel 48 to the ladle cover C. The attachment 50 may be of any of the form shown in U.S. Pat. Nos. 3,952,470; 4,001,996 and 4,381,634, or other commercially available attachment structure.

Figure 2:
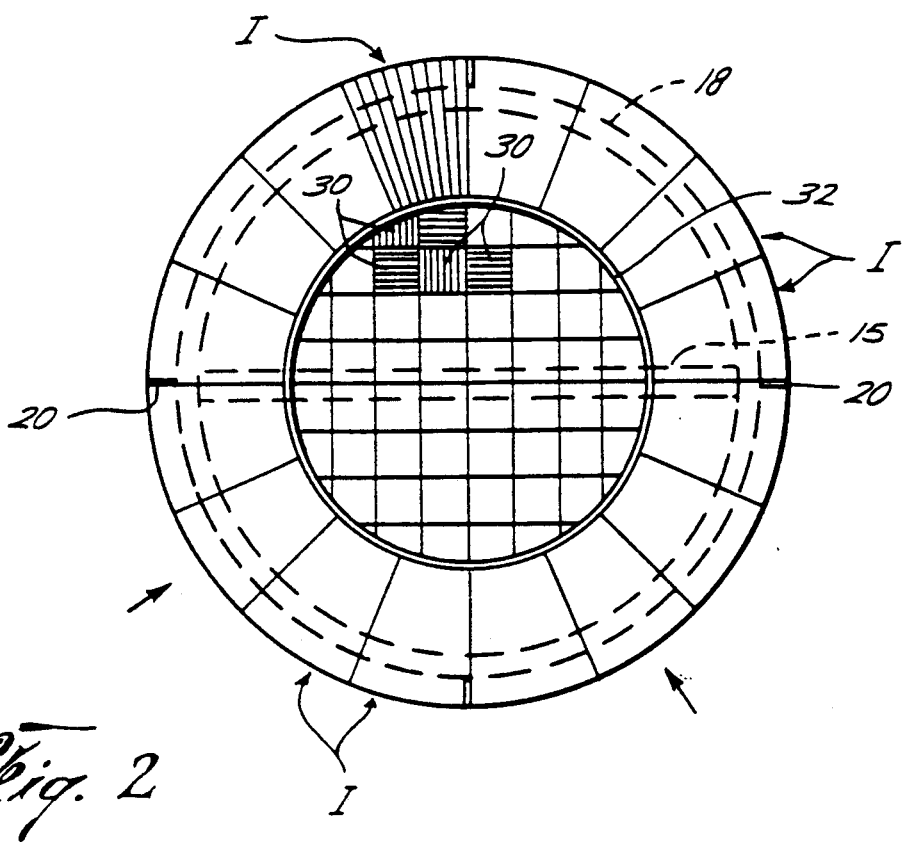
FIG. 2 is a view taken along the line 2—2 of FIG. 1.

In a preferred embodiment of the present invention, however, an attachment or mounting mechanism M (FIG. 6) is utilized which provides for a natural keying action by permitting radial sliding motion (see arrows in FIG. 2) of the modules I during installation. The mechanism M also insures that the insulating units I do not move radially outwardly after installation and that the insulating units I are firmly and properly moved into the appropriate position during installation. The attachment mechanism M is particularly suitable for installation when the surface of the top plate member 14 is warped or uneven.

In the embodiment of FIG. 6, like structure to that of FIGS. 1 through 5 bears like reference numerals. The rods 46 are received in a C-shaped beam or support channel 52 whose legs 54 extend inwardly from the inner surface portions 34 of the insulating unit I. The arms 54 of the beam channel 50 extend between or into adjacent layers of the insulating unit, much in the manner, for example, of U.S. Pat. No. 4,381,634. With the attachment mechanism M, the ring of modules I once installed is stable without inner or outer restraint.

A slide channel member 56 is received within the beam channel member 52 inwardly of the rods 46. The slide channel member 56 has limit lugs 58 formed inside portions thereof. The limit lugs 58 on the slide channel 56 also prevent movement of insulating units I away from the center portion of the ladle cover C during movement, such as installation or removal atop the ladle L.

An inner stopping bracket 60 having a locking snap arm 62 is fixedly attached, such as by welding studs in openings 64, to the top plate member 14 at each location where an insulating unit I is to be installed. The stopping bracket 60 serves as a movement stop, in that its limit snap arm 62 is adapted to engage an inner end 56a of slide channel 56 when the insulating unit I has been properly positioned on the face of the top plate 14. The slide channel member 56 is spot welded or otherwise suitably attached at an outer end 56b to an outer portion of the periphery of the top plate member 14.

It is to be noted that the slide channel member 56 need not extend the full extent of unit I between the inner face 22 and the outer face 24. This permits the insulating material of the units I to extend beyond the rim R and the steel framework F, in effect recessing the support framework F from the outer extremity of the seal ring to protect it from the heat which naturally rises around the side of the ladle cover C.

During installation, the beam channel member 52 slides along slide channel member 56 when the units I are being installed. This insures that the rods 46 travel with the fibers in the units I to prevent fiber tearing. Damaged units I can also be easily replaced since they also in effect unlock in a radial direction. The absence of a retainer ring also facilitates removal of the ring modules for repair, while the center layer Y may be repeatedly reused.

In an alternative ladle cover embodiment C-1 (FIG. 3) of the present invention, the fibers in the insulating units I are maintained in a spaced position and do not seal against the ladle L. In the ladle cover C-1, like structure to that of the cover C bears like reference numerals. It is to be noted in the cover C-1 that the support steel framework F is recessed back from the outer faces 24 of the units I to protect the framework F from heat which naturally rises around the sides of the ladle cover. In the cover C-1, an outrigger support system 90 is provided having centering arms 92 formed for centering purposes and having inner contact arms 94 extending downwardly below the ring of units I and adapted to contact the upper surface 28 of the ladle rim R. Thus, the support system 90 forms in effect structure which holds the fiber away from the ladle rim R. Since there is no combustion taking place within the ladle L, the cover C-1 having the cutrigger support system 90 does not necessarily have to seal tightly against the ladle L. With the cover C-1, the service life of the fibers in the units I is generally lengthened. It is therefore not necessary to use a thicker lining in the ring than in the center section. The thickness may be the same throughout as required only to provide adequate insulation. However, any type of outer diameter retainer ring of the type used in the prior art would have been exposed to a considerable amount of heat. The cover C-1, with the framework F recessed, provides a way to protect the framework F from heat which would flue around the sides of the cover C-1 through openings 96 between the ladle rim R and the insulating units I.

The foregoing disclosure and description of the invention are illustrative and explanatory thereof, and various changes in the size, shape and materials, as well as in the details of the illustrated construction may be made without departing from the spirit of the invention.

I claim:

1. An apparatus for sealing the top of a ladle as it is positioned beneath a ladle cover comprising:
   (a) a plurality of refractory fiber ring insulation units, each of said units comprising:
      (1) a plurality of adjacent layers of refractory ceramic fiber insulating material;
      (2) said layers having an inner surface portion adjacent the ladle cover;
      (3) said layers further having an outer surface portion adapted to be contacted by the rim of the ladle;
      (4) said layers further having intermediate portions extending between said inner and outer surface portions;
   (b) means for mounting said plurality of refractory fiber insulation units beneath the ladle cover, said means for mounting comprising means for mounting said layers in a round patter about a peripheral portion of a lower surface of the ladle cover;

(c) said layers being mounted on said means for mounting in planes extending radially outwardly from a central portion of the ladle cover; and (d) a layer of refractory fiber insulation mounted within said round pattern of said layers.

2. The apparatus of claim 1, wherein:

said layer of refractory fiber insulation is of different thickness than said ring refractory fiber insulation units.

3. An apparatus for sealing the top of a ladle as it is positioned beneath a ladle cover comprising:

(a) a plurality of refractory fiber ring insulation units, each of said units comprising:
   (1) a plurality of adjacent layers of refractory ceramic fiber insulating material;
   (2) said layers having an inner surface portion adjacent the ladle cover;
   (3) said layers further having an outer surface portion adapted to be contacted by the rim of the ladle;
   (4) said layers further having intermediate portions extending between said inner and outer surface portions;

(b) means for mounting said plurality of refractory fiber insulation units beneath the ladle cover, said means for mounting comprising:
   (1) mounting rod means extending transversely through said plurality of transverse layers in said intermediate portions thereof; and
   (2) means for connecting said mounting support rod means to the ladle cover;

(c) said layers being mounted on said means for mounting in planes extending radially outwardly from a central portion of the ladle cover.

4. The apparatus of claim 3, wherein said means for connecting comprises:

(a) a support channel having openings therein for receiving said mounting rod means therein;

(b) means for attaching said support channel to the ladle cover.

5. The apparatus of claim 3, further including:

a slide channel member movably mounted with said support channel for relative movement to resist tearing of the fiber insulating material by said mounting rod means during installation.

6. The apparatus of claim 4, further including:

limits means for preventing movement of said units during movement of the ladle cover.

7. The apparatus of claim 4, further including:

stopping bracket means mounted for engaging an inner end of said slide channel member when said insulation units are in proper mounting position.

8. A ladle cover for sealing the top of a ladle located beneath the cover comprising:

(a) a support framework for attachment to a lift mechanism;

(b) a plurality of refractory fiber ring insulation units, each of said units comprising:
   (1) a plurality of adjacent layers of refractory ceramic fiber insulating material;
   (2) said layer having an inner surface portion adjacent said support framework;
   (3) said layers further having an outer surface portion adapted to be contacted by the rim of the ladle;
   (4) said layers further having intermediate portions extending between said inner and outer surface portions;

(c) means for mounting said plurality of refractory fiber insulation units beneath said support framework, said means for mounting comprising means for mounting said layers in a round pattern about a peripheral portion of a lower surface of the ladle cover;

(d) said layers being mounted on said means for mounting in planes extending radially outwardly from a central portion of said support framework; and (e) a layer of refractory fiber insulation mounted within said round pattern of said layers.

9. The apparatus of claim 8, wherein:

said layer of refractory fiber insulation is of different thickness than said ring refractory fiber insulation units.

* * * * *